Aug. 27, 1963  W. S. TANDLER ETAL  3,101,552
TWIST MEASURING APPARATUS
Filed Aug. 7, 1958  2 Sheets-Sheet 1
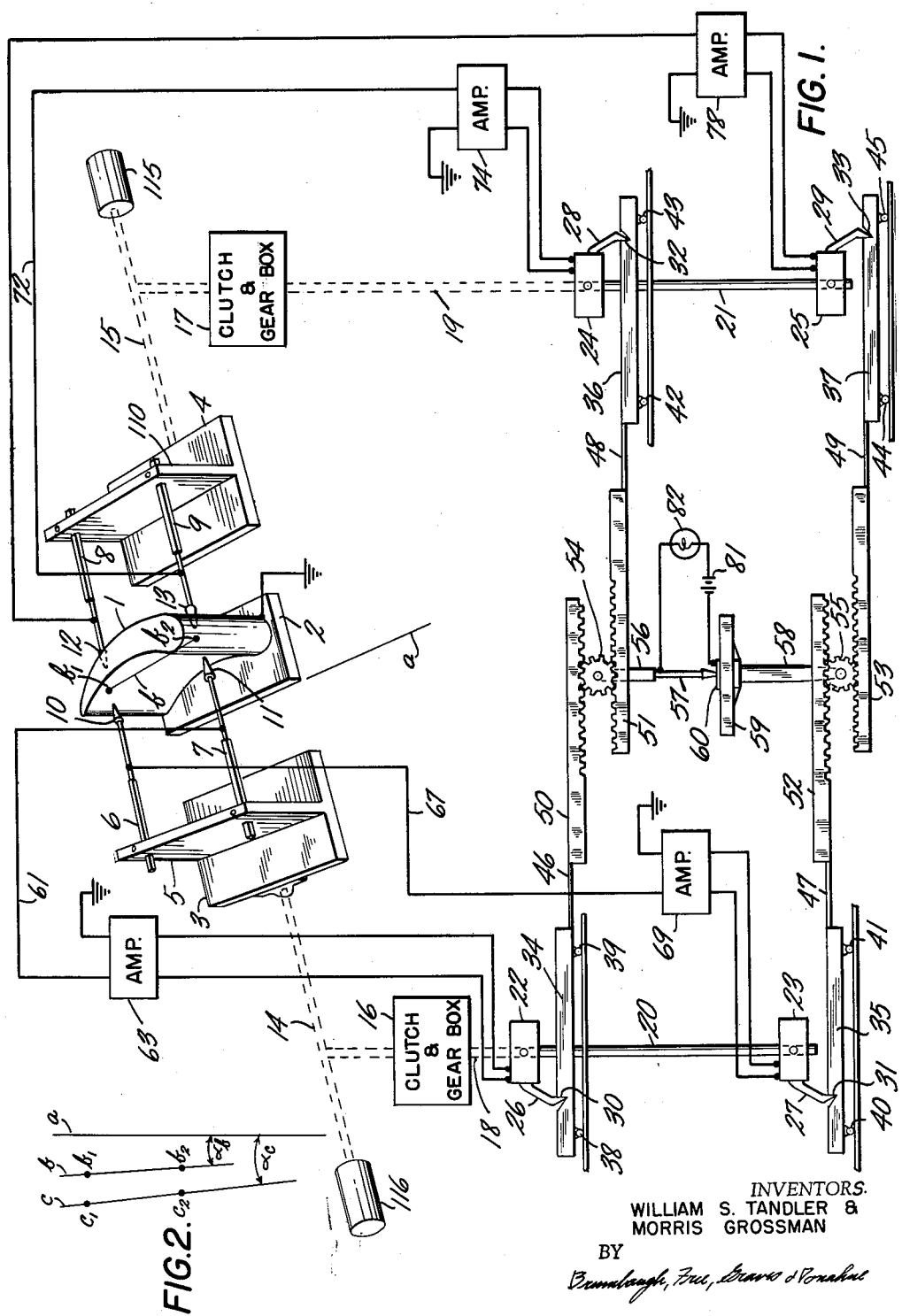
INVENTORS.
WILLIAM S. TANDLER &
MORRIS GROSSMAN
BY
their ATTORNEYS.

Aug. 27, 1963 W. S. TANDLER ETAL 3,101,552
TWIST MEASURING APPARATUS

Filed Aug. 7, 1958 2 Sheets-Sheet 2

INVENTORS.
WILLIAM S. TANDLER &
MORRIS GROSSMAN
BY their ATTORNEYS.

United States Patent Office 3,101,552
Patented Aug. 27, 1963

3,101,552
TWIST MEASURING APPARATUS
William S. Tandler, New York, and Morris Grossman, Brooklyn, N.Y., assignors to The Warner & Swasey Company, Cleveland, Ohio, a corporation of Ohio
Filed Aug. 7, 1958, Ser. No. 753,739
4 Claims. (Cl. 33—174)

This invention relates to a gauging apparatus, and more particularly to an apparatus which will measure a correlation tolerance between two separate, gauged portions of a workpiece.

As an example of such correlation tolerance to be measured, rotating devices for imparting a force from the device to the surrounding medium, such as propellers, turbine buckets, compressor blades, and the like, have their blades twisted about the longitudinal axis of the device. The twist is necessary so that maximum force or thrust will be imparted from the blade to the surrounding medium with as little resistance to motion as possible. To achieve maximum thrust therefore, the dimensions of the blade, including the twist, must be held to close tolerances, and for modern mass production purposes the dimensions must be measured at maximum speed.

It is therefore an object of this invention to provide a new and improved gauging apparatus for measuring a correlation tolerance.

It is another object of this invention to provide a tolerance measuring apparatus which will automatically measure twist with a high degree of accuracy and at maximum speed.

These and other objects are accomplished by providing a tolerance measuring apparatus comprising a plurality of probes having a drive means and adapted to gauge the separate portions of a workpiece between which a correlation tolerance is to be determined, connecting the outputs from the plurality of probes to the input of a differential mechanism, and providing from the double differential mechanism an output which is an indication of the difference of the inputs thereto. While the invention is described in its application to turbine blade testing, it is obvious that the apparatus can be used to measure correlation tolerances of workpieces other than turbine blades.

As a brief summary of one embodiment of the invention adapted to measure the correlation tolerance of "twist," the twist measuring apparatus comprises two pairs of probes, the two probes of each pair being longitudinally aligned with each other and facing in opposite directions with the probes of each pair being on different sides of the blade or other workpiece being tested. Coupled for movement with each pair of probes is a pair of rack gears. Each pair of rack gears has a floating pinion gear enmeshed between the racks so that the 4 racks and 2 pinion gears together form two differential mechanisms. The pinion gear of one mechanism determines the position of a stylus and the pinion gear of the other mechanism determines the position of a tolerance bar which is contacted by the stylus. The stylus and a portion of the tolerance bar are made of an electrically conductive material, and an indicating means is connected between them so that when the stylus contacts the conducting portion the indicating means is energized. The length and position in the direction of stylus movement of the conducting portion of the tolerance bar is a length which is representative of the range of acceptability of the correlation tolerance of twist. Therefore, energization of the indicating means signifies that the gauged blade has an acceptable twist, whereas, conversely, non-energization of the indicating means signifies that the twist is non-acceptable.

As the probes move toward the blade, the rack gears move a proportional distance. When all the probes have contacted the blade, the rack gears will be stationary and the position of each floating pinion gear will represent the position of the midway point between the ends of the corresponding pair of probes. The angular displacement of the line joining the two midway points with respect to a reference line represents the twist of the blade. If the blade has been twisted the proper amount the stylus will rest on the conductive portion of the tolerance bar and the indicating means will be energized.

This invention may be better understood from the following detailed description taken in conjunction with the accompanying drawings in which:

FIGURE 1 is a schematic drawing showing the operation of one embodiment of the invention;

FIGURE 2 shows a comparison of the pitch angles of two blades;

Figure 3:
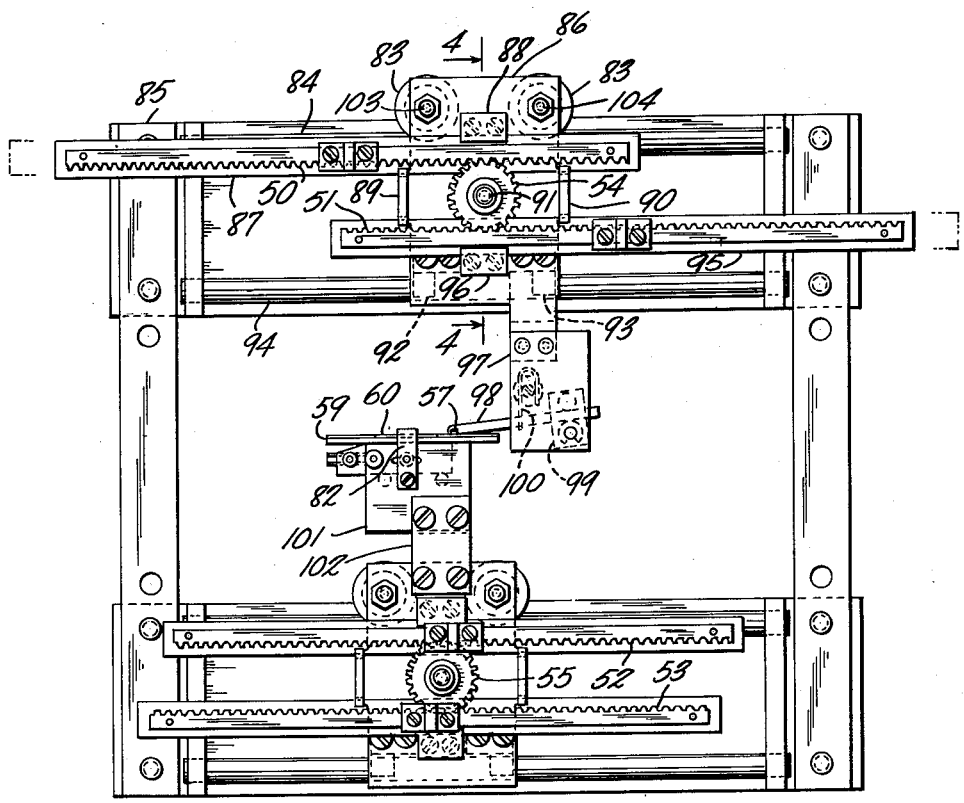
Figure 4:
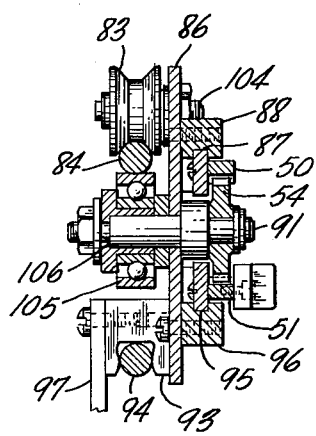

FIGURE 3 of the drawings is a detailed view of some of the components of the embodiment of FIGURE 1; and FIGURE 4 of the drawings is a cross-sectional view taken along the line 4—4 of FIGURE 3.

The schematic diagram of FIG. 1 illustrates the general operation of the invention. The details of the invention are shown in the remaining drawings.

In FIG. 1, the test piece is a turbine blade 1 shown mounted on a supporting block 2. The point $b_1$ on the blade is located on a line between the two probes 10 and 12, and is located midway between the two outer surfaces of the blade as this cross-section. Point $b_2$ is located on a line between probes 11 and 13, and is also located midway between the two surfaces of the blade at this cross-section. The line $b$ drawn between the points $b_1$ and $b_2$ is defined as the center-line of this cross-section, and it is the purpose of the apparatus shown in FIG. 1 to determine whether the center-line $b$ has been angularly displaced with respect to a reference line by the correct amount. The reference line may be arbitrarily taken along the base of the blade or holding mechanism or it may be a line in the plane of rotation of the blade.

The probes 10—13 are retractably mounted in the probe holders 6—9, respectively. The probe holders 6 and 7 are mounted on probe bank 5 and probe drive carriage 3 while probe holders 8 and 9 are mounted on the probe bank 110 and probe drive carriage 4. The probe drive carriages 3 and 4 are connected by the linkages 14 and 15 to the drive mechanisms 116 and 115, respectively. The left tolerance bar drive carriage 20 is also coupled to the drive mechanism 116 through the clutch and gear box 16 and the link 18, while the right tolerance bar drive carriage 21 is coupled to the drive mechanism 115 through the clutch and gear box 17 by the link 19.

Drive mechanisms 115 and 116 propel the two probe drive carriages 3 and 4 toward and away from the test blade 1. By means of the clutch and gear box mechanisms 16 and 17, the movement of the probe drive carriage to the tolerance bar drive carriage is magnified by a ratio of 1:40, so that when the probe drive carriage moves $\frac{1}{40}$ inch, the tolerance bar drive carriage moves 1 inch.

The solenoid disconnect mechanisms 22 and 23 are fastened to the tolerance bar drive carriage 20 and the solenoid disconnect mechanisms 24 and 25 are fastened to the tolerance bar drive carriage 21. The solenoid disconnect mechanism 22 is coupled to tolerance bar 34 by the pawl 26 and detent 30 engagement and is representative of the coupling between the other tolerance bars and disconnect mechanisms. The tolerance bar 34 moves horizontally along the rollers 38 and 39 when the pawl engages the detent and the drive mechanism is in operation. The drive carriages, probe holders and retractable probes, tolerance bars and solenoid disconnect mechanisms may be constructed in a conventional manner or they may be of the type disclosed in our copending application Serial No. 578,841, filed April 17, 1956.

The tolerance bars are attached to the rack gears 50—53 by the links 46—49. The pinion gear 54 meshes with the two racks 50 and 51 and indicates the position of the midway point $b_2$ between the two probes 11 and 13. The pinion gear 55 meshes with the two racks 52 and 53 and indicates the position of the midway point $b_1$ between the two probes 10 and 12. A carriage, which is attached to pinion gear 54, supports the stylus holder 56 which in turn supports the twist stylus 57. A second carriage, which is attached to pinion gear 55, supports the link 58 and twist tolerance bar 59.

The twist stylus 57 and the portion 60 of the twist tolerance bar are made of an electrically conductive material so that when the twist stylus is resting on the conductive portion of the twist tolerance bar, a circuit is completed through the battery 81 and the light 82, energizing the circuit. As stated the conductor portion of the tolerance bar represents by its length and position the range of tolerance acceptability for twist. In other words the two marginal edges in the direction of stylus movement of the conductor portion represent the inside and outside tolerance limit of acceptable twist.

Each of the probes 10—13 is electrically connected to a separate one of amplifier circuits 63, 69, 74 and 78 and one of the solenoid disconnect mechanisms 22—25. When a probe, such as probe 10, comes into contact with the blade 1, a circuit is completed whereby current flows from the probe to the test piece 1, to ground, the amplifier circuit 69, through the line 67, and back to the probe 10. This signal is amplified by the amplifier 69, and energizes the solenoid disconnect mechanism 23. As each probe touches the blade 1, the solenoid disconnect mechanism coupled to that probe is energized and disengages the pawl from the detent on the tolerance bar, causing the tolerance bar to come to rest. A conventional brake may be installed to brake the tolerance bar to the frame when the solenoid is energized. After the four tolerance bars and four racks have come to rest the positions of the two pinion gears indicates the positions of the points $b_1$ and $b_2$. If the angle of the line between the two points has an angular displacement from a reference line which lies within the range of acceptability for the twist which is measured by such angular displacement, the twist stylus will rest on the conductive portion of the twist tolerance bar and the indicating means will be energized to indicate that the twist of the blade is acceptable. Otherwise the indicating means will not be energized, and it will thereby be known that the twist of the blade is not acceptable.

The correct position of the conductive portion of the twist tolerance bar is determined beforehand by inserting a master blade into the test piece holder and bringing the probes into contact with the master blade. The twist tolerance bar and the twist stylus are then set so that the twist stylus will rest at the center of the conductive portion of the twist tolerance bar. The test blades are thereafter tested by comparing them with the master blade. If the twist of the blades are within acceptable limits, the stylus will rest on the conductive portion of the tolerance bar and the indicator will be energized. The width of the conductive portion determines the range of acceptable twists.

A comparison of the twist of a master blade and a test blade is shown in FIG. 2. The line $a$ is taken as the reference line and may be an arbitrarily chosen line on the base or it may be a line in the plane of rotation of the blade. The line $b$ joining the points $b_1$ and $b_2$ is the center-line of the cross-section at which the probes come into contact with the blade. The angle that the center-line $b$ makes with the reference line is called the pitch angle $ab$ of this cross-section. The line joining the points $c_1$ and $c_2$ is the center-line of the master-blade at the cross-section at which the probes come into contact with the master blade and the angle $ac$ is the pitch angle of this cross-section. It is the function of the previously described embodiment to compare the angles $ab$ and $ac$ and thereby determine whether the blade has been twisted by the proper amount.

FIGURE 3 is a view showing the rack and pinion arrangement together with the twist stylus and the twist tolerance bar. The racks 50 and 51 are supported by the bars 87 and 95, and are meshed with the floating pinion gear 54. The bar 87 is supported by the guide rails 88, 89 and 90 and the bar 95 is supported by the guide rails 89, 90 and 96. The position of the floating pinion gear 54 is determined by the position of the two racks 50 and 51 and may be calculated by the formula $\frac{1}{2}(a-b)$, where $a$ is the distance traveled by rack 50 and $b$ is the distance traveled by rack 51 in the opposite direction.

The two rails 84 and 94 support the trolley on the frame 85. As can be best seen in FIG. 4 the two wheels 83 support the trolley and the wheel 105 prevents the trolley from moving upwards while the guides 92 and 93 prevent lateral movement. The wheels 83 are coupled to the trolley frame 86 by the axles 103 and 104, and the pinion gear 54 is coupled to the trolley frame 86 by the axle 91 and the sleeve 106. Coaxial with the pinion gear is the wheel 105.

The trolley arrangement associated with the pinion gear 55 is similar to the upper trolley, and the description need not be repeated.

The stylus holder 98 is attached to the frame 86 of the upper trolley by the linkage 97. The position of the stylus 57 attached to the end of the stylus holder 98 may be controlled by adjusting the spring 100 and the clamp 99. The lower trolley frame supports linkage 102 which, in turn, supports the twist tolerance bar 59 through the twist tolerance bar holder 101. The twist tolerance bar 59 has an electrically conductive portion 60 on its upper surface. An electrical indicating means is connected between the stylus 57 and the contact 82, which connects to the conductive portion 60. When the stylus 57 is resting on the conductive portion 60, an electrical circuit is completed from the stylus to the portion 60, the contact member 82 and the indicating means. Energization of the indicating means indicates that the twist of the blade being tested is within acceptable limits.

The following is a brief description of the operation of the twist measuring apparatus. The drive mechanism propels the drive carriages toward the blade being measured causing the probes to come into contact with the blade. As each probe contacts the blade the solenoid disconnect mechanism connected to that probe through an amplifier is triggered and releases the tolerance bar associated with that probe. As each tolerance bar is dropped off, it and the rack gear linked to it come to rest. After the four twist measuring probes have come in contact with the test piece, the four racks are locked in position and the pinion gears enmeshed with them are stationary. At this position the twist measuring stylus should, if the twist of the blade being measured is within predetermined limits, be on the conductive portion of the twist tolerance bar. If the twist stylus is on the conductive portion, the indicating circuit will be energized and will indicate that the twist of the blade is acceptable.

While particular embodiments of the present invention have been shown and described, it is apparent that changes and modifications may be made without departing from this invention in its broader aspects. For example the invention may be used to determine the angular displacement of any blade or test piece with respect to a reference line. The position of the points $b_1$ and $b_2$ may be determined individually by the position of the pinion gears 55 and 54. The angular displacement from a reference line of the chord joining the points of contact of probes 10 and 11 may be determined by coupling rack gear 53 to probe 11 instead of to probe 12. The thickness of the blade between the points of contact of probes 10 and 12 may be determined by reversing the direction of travel of rack gear 53. The thickness of the blade may be calculated from the formula $a+b-2d$, where $a$ is the distance traveled by rack 52 from a reference point, $b$ is the distance traveled by rack 53 in the same direction from the reference point, and $d$ is distance from the reference point to the final position of pinion gear 55. Other measurements could be made by offsetting the probes from each other. Therefore the invention described herein is not to be construed as limited save as is consonant with the scope of the following claims.

We claim:

1. Twist measuring apparatus for automatically measuring the twist of a test piece comprising a first pair and a second pair of probes, the probes of each pair being longitudinally aligned with each other and directed in opposite directions, means holding the test piece between the probes of each pair, movable means supporting said pairs of probes laterally of each other, drive means for moving the probe-supporting means to bring the probes into contact with the test piece, four solenoid disconnect mechanisms, each of said solenoid disconnect mechanisms being electrically connected to a different one of said probes, linkages coupling said probe supporting means to said solenoid disconnect mechanisms, said linkages including a clutch and a gear box which magnifies the movement of the probe supporting means, a first and a second pair of movable racks, each rack coupled to a different one of said solenoid disconnect mechanisms, two floating pinion gears, each of said pinion gears enmeshed with one of said pairs of racks, one of said pinion gears supporting a twist tolerance bar and the other one of said pinion gears supporting a twist stylus, electrical indicating means connected between said twist stylus and an electrically conductive portion of said twist tolerance bar to indicate when the twist stylus is resting on said electrically conductive portion of said twist tolerance bar, electrical means connecting each of said probes to a different one of four amplifiers, and each amplifier electrically connected to one of said four solenoid disconnect means, the connections being such that the two solenoid disconnect mechanisms electrically connected to said first pair of probes are mechanically coupled to said first pair of racks, and the two remaining solenoid disconnect mechanisms are electrically coupled to said second pair of probes and are mechanically coupled to said second pair of racks.

2. Apparatus for gauging a workpiece comprising, first and second probes each positionally related in a predetermined manner to a reference datum and adapted to make respective contact with opposite portions of a cross section of said workpiece by respective motions of said probes towards each other; and a differential means having first and second independently operable elements each responsive to the motion into contact of the correspondingly designated probe to register the progressive change in position undergone thereby during such motion by a proportional progressive change in the element, said differential means also having a third indicating element responsive to the difference in the changes assumed by said first-named elements to itself change in instantaneous condition from a standard condition in proportion to said difference, and said differential means being constructed to render said standard and instantaneous conditions representative, relative to said datum of, respectively, a standard location for the midpoint between said portions and the instantaneous location of the midpoint between said moving probes, whereby the coming into contact of both probes with said workpiece induces in said third element a total amount of change proportional to and indicating the departure of the actual midpoint between said portions from said standard location.

3. Apparatus for measuring the twist relative to a reference line of a cross section of a workpiece comprising: a pair of first probes each positionally related in predetermined manner to said line and adapted to make respective contacts with opposite portions of said cross section, at a first station therealong in the direction of said line, by respective motions of said probes towards each other; first differential means responsive to the motions into contact of said first probes to produce an output proportional to the departure of the actual midpoint between said opposite portions at said first station from a standard location, relative to said line, for said midpoint; a pair of second probes similar to said first probes except adapted to make respective contacts with opposite portions of said cross section at a second station spaced from the first in said direction, second differential means responsive to the motions of said second probes to produce an output proportional to the departure of the actual midpoint between said opposite portions at said second station from a standard location, relative to said line, for said last named midpoint; and means responsive to the difference in value between the outputs of said first and second differential means to indicate an angular relation between said reference line and a line passing through said midpoints at said first and second stations.

4. A twist-measuring apparatus for automatically measuring the twist of a test piece, comprising a plurality of probes, a plurality of pairs of rack gears, each of said probes corresponding to one of said rack gears, drive means coupled with said plurality of probes to move said probes into contact with the test piece, said drive means also being coupled to a first of said pairs of rack gears and a second of said pairs of rack gears and adapted to move each of the rack gears of said first and second pairs of rack gears a distance proportionate to the distance moved by the probe corresponding thereto, a separate pinion gear enmeshed with each of said pairs of rack gears, said pinion gears supporting automatic indicating means, said automatic indicating means including a stylus connected to one of said pinion gears and a tolerance bar connected to the other of said pinion gears, said stylus and a portion of said tolerance bar being of an electrically conductive material, a source of electric potential and an electrical indicating means connected to said stylus and said conductive portion of said tolerance bar so that when said stylus is in contact with said conductive portion the electrical indicating means will be energized and will measure the twist of the test piece.

References Cited in the file of this patent

UNITED STATES PATENTS

| | | |
|---|---|---|
| 417,840 | Ross | Dec. 24, 1889 |
| 871,333 | Giambra | Nov. 19, 1907 |
| 1,062,700 | Firsching | May 27, 1913 |
| 1,806,756 | Harding | May 26, 1931 |
| 2,150,070 | Kregecz | Mar. 7, 1939 |
| 2,573,843 | Hendrix | Nov. 6, 1951 |
| 2,638,680 | Baker | May 19, 1953 |
| 2,731,825 | Le Van | Jan. 24, 1956 |
| 2,863,222 | Comstock | Dec. 9, 1958 |

FOREIGN PATENTS

| | | |
|---|---|---|
| 369,878 | Great Britain | Mar. 31, 1932 |
| 630,173 | Germany | May 22, 1936 |

OTHER REFERENCES

Product Engineering, pp. 119–123 (particularly 122), September 1949.

Aircraft Production, pp. 381–387, November 1952.